(12) United States Patent
Kobayashi et al.

(10) Patent No.: US 9,380,529 B2
(45) Date of Patent: Jun. 28, 2016

(54) WIRELESS ACCESS POINT TERMINAL AND CONNECTION CONTROL METHOD

(71) Applicant: Panasonic Corporation, Osaka (JP)

(72) Inventors: Hirokazu Kobayashi, Tokyo (JP); Masaaki Harada, Hyogo (JP); Kazushige Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 173 days.

(21) Appl. No.: 14/352,657

(22) PCT Filed: Nov. 16, 2012

(86) PCT No.: PCT/JP2012/007357
§ 371 (c)(1),
(2) Date: Apr. 17, 2014

(87) PCT Pub. No.: WO2013/080470
PCT Pub. Date: Jun. 6, 2013

(65) Prior Publication Data
US 2014/0241228 A1    Aug. 28, 2014

(30) Foreign Application Priority Data
Dec. 2, 2011    (JP) .................. 2011-264567

(51) Int. Cl.
*H04Q 7/24*    (2006.01)
*H04W 52/02*    (2009.01)
*H04W 76/06*    (2009.01)
*H04W 76/04*    (2009.01)
*H04W 84/12*    (2009.01)
*H04W 88/08*    (2009.01)

(52) U.S. Cl.
CPC ........ *H04W 52/0206* (2013.01); *H04W 76/045* (2013.01); *H04W 76/06* (2013.01); *H04W 76/068* (2013.01); *H04W 84/12* (2013.01); *H04W 88/08* (2013.01); *Y02B 60/50* (2013.01)

(58) Field of Classification Search
CPC ...... H04W 72/10; H04W 74/06; H04W 84/20
USPC .............. 370/311, 328, 338; 455/41.2, 452.2
See application file for complete search history.

(56) References Cited

U.S. PATENT DOCUMENTS 7,164,887 B2 *    1/2007    Tanada ................. H04W 84/20
                                                 455/343.2
2002/0042275 A1 *    4/2002    Kitazawa ............. H04W 72/10
                                                 455/452.2
(Continued)

FOREIGN PATENT DOCUMENTS

CN    102246561 A    11/2011
EP    1519612 A2    3/2005
(Continued)

OTHER PUBLICATIONS

Supplementary European Search report for application No. 12854339.4-1505/278774 PCT/JP2012007357 dated Oct. 20, 2015.
(Continued)

*Primary Examiner* — Wanda Z Russell
(74) *Attorney, Agent, or Firm* — Pearne & Gordon LLP

(57) ABSTRACT

A wireless access point terminal capable of reducing power consumption even if housed terminals are present is provided. The wireless access point terminal individually connects a plurality of housed terminals to a network using a wireless communications unit capable of individual wireless communications with the plurality of housed terminals. The wireless access point terminal has: a housed terminal management unit that determines whether or not to continue connection for each connected housed terminal; and a connection control unit that controls the wireless communications unit such that the wireless communication is disconnected for a housed terminal for which a determination has been made to not continue the connection.

7 Claims, 16 Drawing Sheets

(56) References Cited

U.S. PATENT DOCUMENTS

2005/0141543 A1* 6/2005 Nishimura ............ H04W 74/06
                                                    370/443
2010/0003921 A1    1/2010  Godlewski
2011/0244870 A1   10/2011  Lee

FOREIGN PATENT DOCUMENTS

| EP | 2378810 A2    | 10/2011 |
| JP | 2009-302798 A | 12/2009 |
| JP | 2010-062780 A | 3/2010  |
| JP | 2010-161605 A | 7/2010  |
| JP | 2011-199762 A | 10/2011 |

OTHER PUBLICATIONS

"Part11: Wireless LAN Medium Access Control (MAC) and Physical Layer (PHY) Specifications," IEEE Std 802.11-2007, Jun. 12, 2007, p. 425-436.

International Search Report for Application No. PCT/JP2012/007357 dated Dec. 11, 2012.

* cited by examiner

| ASSOCIATION ID | MAC ADDRESS | CONNECTION START TIME |
| --- | --- | --- |
| 1 | 11:22:33:44:55:66 | T1 |
| 2 | 01:02:03:04:05:06 | T2 |
| 3 | aa:bb:cc:dd:ee:ff | T3 |
| 4 | 0a:0b:0c:0d:0e:0f | T4 |
| 5 | 98:76:54:32:10:ab | T5 |

| NORMAL MODE CONNECTION SETTING PARAMETER | |
|---|---|
| BEACON PERIOD | 100ms |
| DTIM PERIOD | 1 |
| MAXIMUM TRANSMISSION POWER | 15dBm |
| MAXIMUM NUMBER OF RETRANSMISSIONS | 5 |
| TRANSMISSION RATE USED | 1M,2M,5.5M,6M,9M,11M,12M,18M,24M,36M,48M,54M |
| MAXIMUM NUMBER OF ALLOWABLE TERMINALS | 10 |

522

| LIMITED OPERATION MODE CONNECTION SETTING PARAMETER | |
|---|---|
| BEACON PERIOD | 500ms |
| DTIM PERIOD | 5 |
| MAXIMUM TRANSMISSION POWER | 5dBm |
| MAXIMUM NUMBER OF RETRANSMISSIONS | 1 |
| TRANSMISSION RATES USED | 2M,24M,54M |
| MAXIMUM NUMBER OF ALLOWABLE TERMINALS | 1 |

FIG. 6

WIRELESS ACCESS POINT TERMINAL AND CONNECTION CONTROL METHOD

TECHNICAL FIELD

The present invention relates to a wireless access point terminal which serves as a wireless access point for a plurality of terminals, and a connection control method used in the wireless access point terminal.

BACKGROUND ART

Wireless communication systems have been widely spread as a data communication means because of their high convenience, for example, only few location restrictions as to where they are used. Examples of such wireless communication systems include a wireless communication system employing an infrastructure mode in the wireless LAN prescribed in IEEE 802.11 (see NPL 1). The spread of this wireless communication system has been accelerated because networks can be easily built with unspecified mobile terminals. Hereinafter, mobile terminals which perform wireless communication in the above-described wireless communication system will be referred to as "wireless LAN terminals."

In the infrastructure mode, a wireless LAN terminal of a plurality of wireless LAN terminals serves as an access point. The wireless LAN terminal which serves as an access point (hereinafter, referred to as a "wireless access point terminal") includes a wireless communication section which can individually perform wireless communication with a plurality of wireless LAN terminals. The wireless access point terminal connects the other wireless LAN terminals to a network individually using the wireless communication section. That is, the wireless access point terminal transfers data between each wireless LAN terminal and the network or other wireless LAN terminals.

In addition to the data transfer operation, the wireless access point terminal performs operations such as periodic transmission of a beacon signal and standby for data transmitted from the wireless LAN terminals in order to maintain connection with the wireless LAN terminals to the network. For this reason, the processing load and power consumption of the wireless access point terminal increase as the number of the wireless LAN terminals connected to the network (within the area served by the wireless access point terminal) increases. As described above, since the wireless LAN terminals are mobile terminals and thus are basically driven by batteries, power saving is preferred.

In this respect, PTL 1 discloses a technique for reducing the frequency of beacon transmission when there is no wireless LAN terminal within the area served by the wireless access point terminal (hereinafter, referred to as an "in-coverage terminal"), for example. According to this related art, it is possible to reduce power consumption of the wireless access point terminal when there is no in-coverage terminal.

CITATION LIST

Patent Literature

PTL 1
Japanese Patent Application Laid-Open No. 2009-302798

Non-Patent Literature

NPL 1
"Part 11: Wireless LAN Medium Access Control (MAC) and Physical Layer (PHY) Specifications," IEEE Std 802.11-2007, 12 Jun. 2007, P. 425-436

SUMMARY OF INVENTION

Technical Problem

However, the related art has a problem in that the power consumption of the wireless access point terminal cannot be reduced when there is an in-coverage terminal.

An object of the present invention is to provide a wireless access point terminal and a connection control method which can reduce power consumption even when there is an in-coverage terminal.

Solution to Problem

A wireless access point terminal according to an aspect of the present invention is a wireless access point terminal configured to individually connect a plurality of in-coverage terminals to a network using a wireless communication section that is allowed to individually perform wireless communication with the plurality of in-coverage terminals, the wireless access point terminal including: an in-coverage terminal managing section that determines whether or not to continue the connection for each of the connected in-coverage terminals; and a connection control section that controls the wireless communication section to discontinue the wireless communication with the in-coverage terminal which is determined not to be continuously connected.

A connection control method according to an aspect of the present invention is a connection control method in a wireless access point terminal configured to individually connect a plurality of in-coverage terminals to a network using a wireless communication section that is allowed to individually perform wireless communication with the plurality of in-coverage terminals, the connection control method including: determining whether or not to continue connection for each of the connected in-coverage terminals; and controlling the wireless communication section to discontinue the wireless communication with the in-coverage terminal which is determined not to be continuously connected.

Advantageous Effects of Invention

According to the present invention, it is possible to reduce power consumption even when there is an in-coverage terminal.

BRIEF DESCRIPTION OF DRAWINGS

FIG. 4 illustrates an example of contents of management information in Embodiment 2 of the present invention;

FIG. 6 illustrates an example of content of a connection setting parameter in Embodiment 2 of the present invention;

DESCRIPTION OF EMBODIMENTS

Embodiments of the present invention will be described in detail with reference to the accompanying drawings.

Embodiment 1

Embodiment 1 of the present invention is one example of a basic mode of the present invention.

Figure 1:
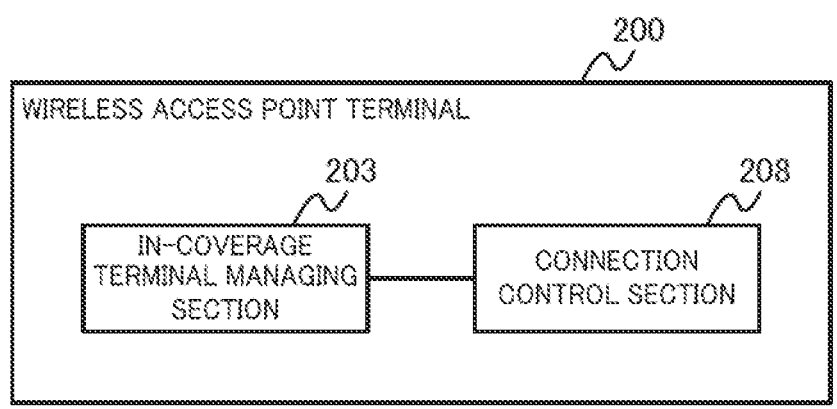
FIG. 1 is a block diagram illustrating a configuration of a wireless access point terminal according to Embodiment 1 of the present invention.

FIG. 1 is a block diagram illustrating a configuration of a wireless access point terminal according to this embodiment.

In FIG. 1, wireless access point terminal 200 is a mobile wireless communication terminal which has a function to serve as a wireless access point. Wireless access point terminal 200 individually connects a plurality of in-coverage terminals to a network using a wireless communication section which can perform wireless communication with the plurality of in-coverage terminals individually. Wireless access point terminal 200 has in-coverage terminal managing section 203 and connection control section 208.

In-coverage terminal managing section 203 determines whether or not to continue connection for each connected in-coverage terminal.

Connection control section 208 controls the above-described wireless communication section so as to discontinue wireless communication with the in-coverage terminal which is determined not to be continuously connected.

Wireless access point terminal 200 has, for example, although not shown, a CPU (central processing unit), a storage medium such as a ROM (read only memory) which stores a control program, and a working memory such as a RAM (random access memory). In this case, the functions of the respective sections are implemented by the CPU which executes the control program.

Because wireless access point terminal 200 can determine whether or not to continue connection with each in-coverage terminal and discontinue wireless communication with the in-coverage terminal which is determined not to be continuously connected, it is possible to reduce power consumption even when there is an in-coverage terminal.

Embodiment 2

Embodiment 2 of the present invention is an example of a specific aspect where the present invention is applied to a local area network composed of mobile wireless LAN terminals.

<Configuration of Wireless Communication System>

First, a configuration of a wireless communication system including a wireless access point terminal according to this embodiment will be described.

Figure 2:
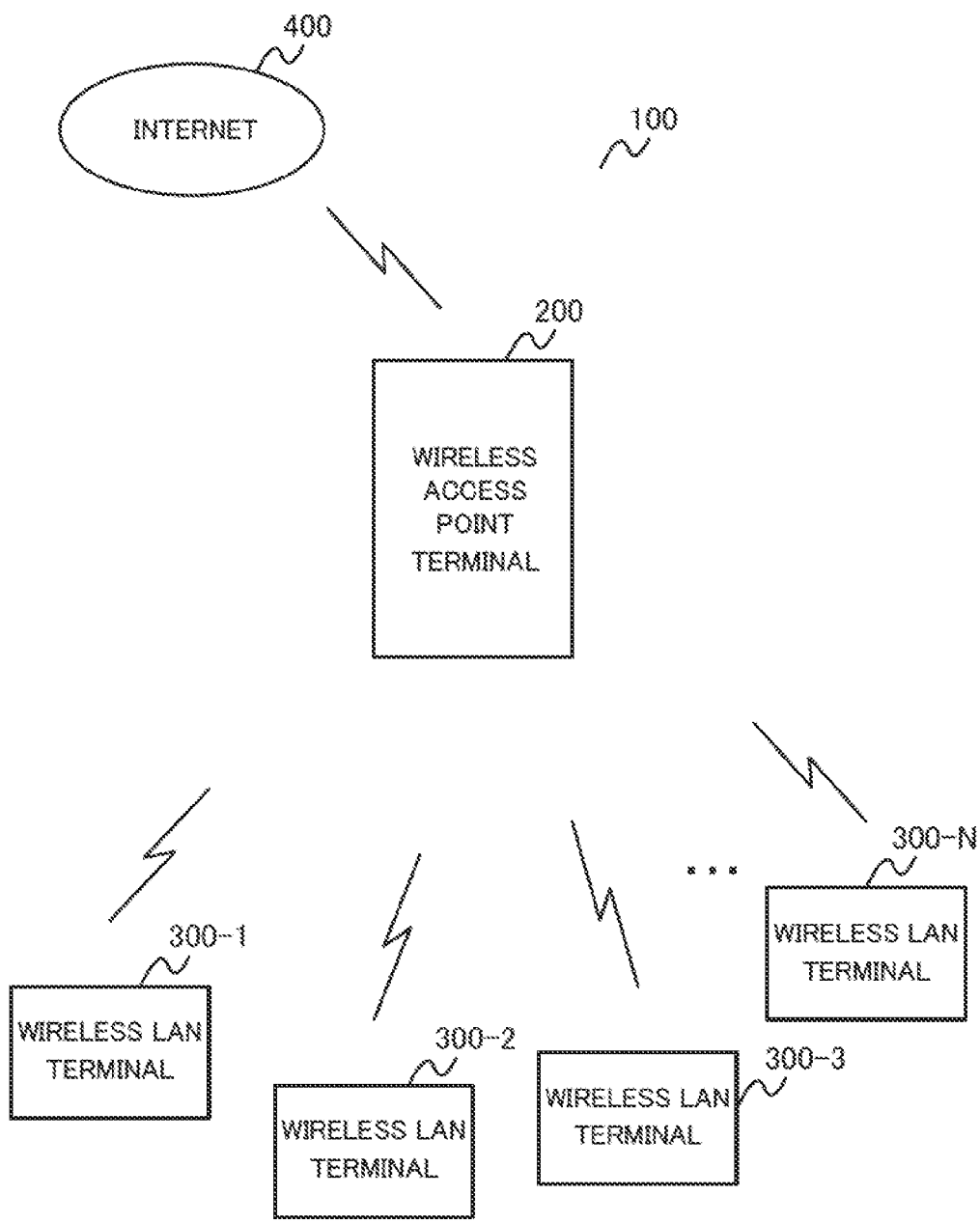
FIG. 2 is a system configuration diagram illustrating an example of a wireless communication system including a wireless access point terminal according to Embodiment 2 of the present invention.

FIG. 2 is a system configuration diagram illustrating an example of the configuration of the wireless communication system including the wireless access point terminal according to this embodiment.

In FIG. 2, wireless communication system 100 has wireless access point terminal 200, and first to N-th wireless LAN terminals 300-1 to 300-N which are in-coverage terminals of wireless access point terminal 200.

Wireless access point terminal 200 is a wireless LAN terminal which has a function to serve as a wireless access point. Wireless access point terminal 200 serves first to N-th wireless LAN terminals 300-1 to 300-N. That is, wireless access point terminal 200 transfers data between each wireless LAN terminal 300 and Internet 400 or another wireless LAN terminal 300. Hereinafter, Internet 400, and a local area network including first to N-th wireless LAN terminals 300-1 to 300-N are simply referred to as a "network."

Wireless access point terminal 200 according to this embodiment switches between operation for a normal mode and operation for a limited operation mode as appropriate. The normal mode is an operation mode in which data can be transferred for all first to N-th wireless LAN terminals 300-1 to 300-N which are in-coverage terminals. The limited operation mode is an operation mode in which wireless communication with wireless LAN terminal 300 which is not connected to the network is disconnected, while operation of wireless communication with wireless LAN terminal 300 which is connected to the network is limited to reduce power consumption.

That is, in the case of the normal mode, wireless access point terminal 200 connects all first to N-th wireless LAN terminals 300-1 to 300-N to the network.

Meanwhile, in the limited operation mode, wireless access point terminal 200 disconnects wireless communication with, for example, first and third to N-th wireless LAN terminals 300-1, 300-3 to 300-N so that these wireless LAN terminals are not connected to the network. Wireless access point terminal 200 connects second wireless LAN terminal 300-2 to the network while limiting operation of wireless communication. The limitation of the operation of the wireless communication is defined by a connection setting parameter which will be described later and includes, for example, reduction of a maximum transmission power and reduction of the number of transmission rates to be used.

Because wireless access point terminal 200 can discontinue the wireless communication for each in-coverage terminal and can further limit the operation of the wireless communication, it is possible to reduce power consumption even when there is an in-coverage terminal.

The configuration of wireless communication system 100 has been described above.

<Configuration of Wireless Access Point Terminal>

A configuration of wireless access point terminal 200 will be described below.

Figure 3:
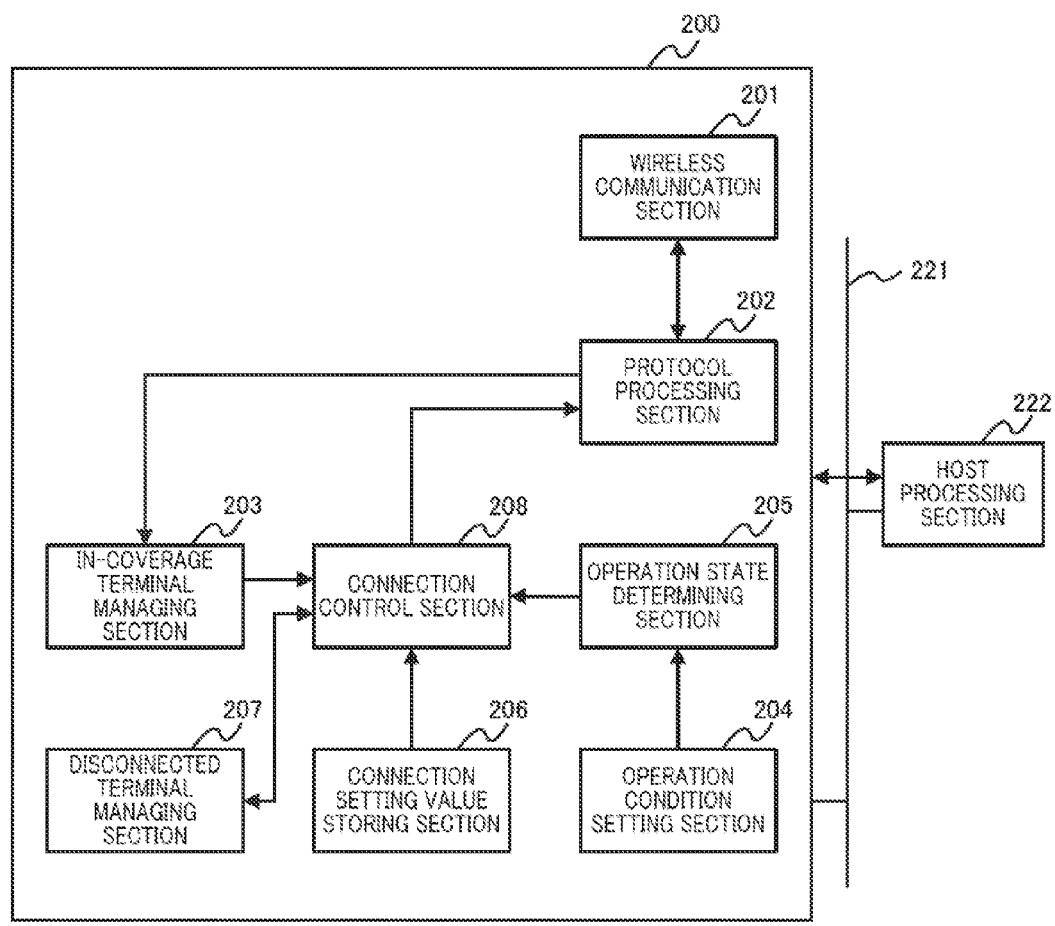
FIG. 3 is a block diagram illustrating an example of a configuration of the wireless access point terminal according to Embodiment 2 of the present invention.

FIG. 3 is a block diagram illustrating an example of the configuration of wireless access point terminal 200. It should be noted that in this embodiment, wireless communication performed by wireless access point terminal 200 complies with a wireless LAN standard prescribed in, for example, IEEE 802.11 (see NPL 1).

In FIG. 3, wireless access point terminal 200 has wireless communication section 201, protocol processing section 202, in-coverage terminal managing section 203, operation condition setting section 204, operation state determining section 205, connection setting value storing section 206, disconnected terminal managing section 207 and connection control section 208.

Wireless communication section 201 which includes an RF (Radio Frequency) circuit for transmitting and receiving a radio wave using a high frequency band, converts an analog signal to be handled at the RF circuit into a digital signal and performs physical layer processing including baseband processing according to the communication standard.

Protocol processing section 202 performs wireless communication with first to N-th wireless LAN terminals 300-1 to 300-N individually using wireless communication section 201.

More specifically, protocol processing section 202 performs control of a wireless communication protocol conforming to a defined protocol, such as media access control and logical link control. Further, when receiving a connection request signal (association request) from wireless LAN terminal 300, protocol processing section 202 assigns an association identifier (association ID) to corresponding wireless LAN terminal 300. Protocol processing section 202 then manages a MAC (Media Access Control) address of corresponding wireless LAN terminal 300 and reports the association ID and the MAC address to in-coverage terminal managing section 203. Further, protocol processing section 202 generates a disconnection signal (disassociation) in response to an instruction to discontinue wireless communication from connection control section 208 and transmits the disconnection signal via wireless communication section 201. Still further, protocol processing section 202 generates a reconnection signal (reassociation response) in response to an instruction to reconnect wireless communication from connection control section 208, and transmits the reconnection signal via wireless communication section 201.

In-coverage terminal managing section 203 determines whether or not to continue connection for each wireless LAN terminal 300 which is connected to the network.

More specifically, in-coverage terminal managing section 203 acquires terminal attribute information for each served wireless LAN terminal 300 based on the report from protocol processing section 202 and manages the acquired terminal attribute information. Here, the terminal attribute information is information indicating priority for continuing connection of wireless LAN terminal 300. In-coverage terminal managing section 203 determines whether or not to continue connection to the network based on information (hereinafter, referred to as "management information") for managing the connection of each wireless LAN terminal 300 including the terminal attribute information. In this embodiment, the management information includes an elapsed time since start of wireless communication. In-coverage terminal managing section 203 gives priority to the in-coverage terminal with a longer elapsed time to determine continuation of the connection. In-coverage terminal managing section 203 outputs the determination result to connection control section 208. It should be noted that in-coverage terminal managing section 203 may determine whether or not to continue connection sequentially or in response to a request from connection control section 208.

<Explanation of Management Information>

FIG. 4 illustrates an example of contents of management information.

As illustrated in FIG. 4, in management information 500, association ID 501, MAC address 502 and connection start time 503 are described in association with each other.

Association ID 501 and MAC address 502 are an association ID and a MAC address reported from protocol processing section 202 every time wireless communication with wireless LAN terminal 300 is started. Connection start time 503 is the start time of wireless communication with wireless LAN terminal 300, and is, for example, a time when the association ID and the MAC address are reported from protocol processing section 202. In this embodiment, connection start time 503 corresponds to the above-described terminal attribute information.

Operation condition setting section 204 in FIG. 3 sets a condition for judging that it is required to reduce power consumption.

More specifically, operation condition setting section 204 stores operation state information in advance. In the operation state information, an operation condition in the limited operation mode is defined in relation to the remaining battery level of a battery (not shown) of wireless access point terminal 200 or whether or not wireless access point terminal 200 is connected to an AC power source. Operation condition setting section 204 may receive setting or change of the operation state information from a user.

<Explanation of Operation State Information>

Figure 5:
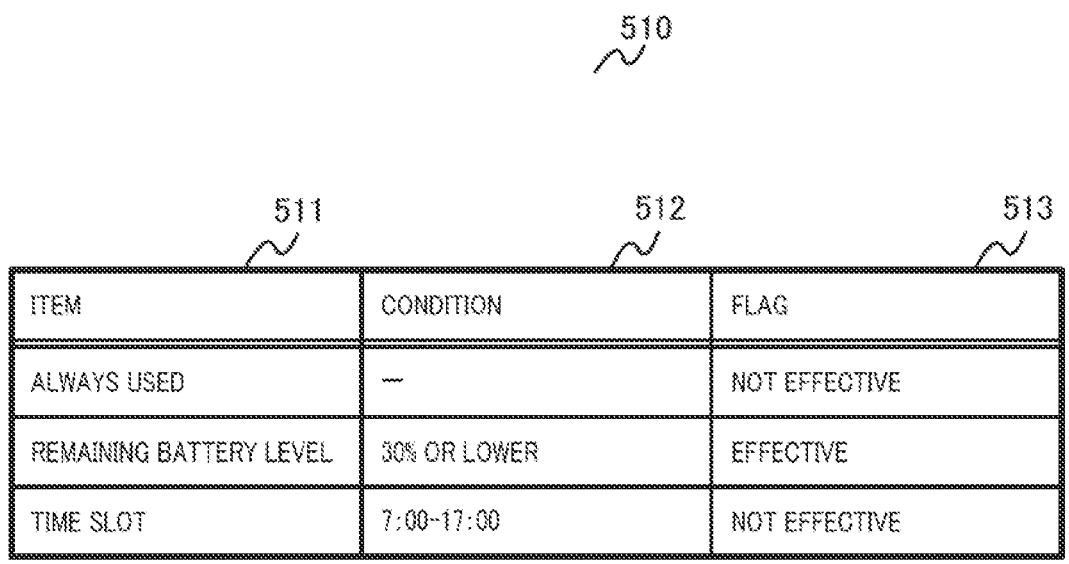
FIG. 5 illustrates an example of content of operation state information in Embodiment 2 of the present invention.

FIG. 5 illustrates an example of contents of the operation state information.

As illustrated in FIG. 5, in operation state information 510, condition 512 and flag 513 are described in association with item 511 which indicates a target used to judge whether or not the condition is satisfied. Flag 513 indicates whether the result of the judgment is effective or not.

For example, in FIG. 5, flag 513 which is associated with item 511 of "remaining battery level" indicates "effective" and condition 512 associated with corresponding item 511 indicates "30% or lower." In this case, operation state information 510 indicates that a necessary and sufficient condition for judging that it is required to reduce power consumption is that the remaining battery level of wireless access point terminal 200 is 30% or lower.

Further, consider that flag 513 further associated with item 511 of "time slot" and condition 512 of "7:00 to 17:00" indicates "effective." In this case, a necessary and sufficient condition for judging that it is required to reduce power consumption is that the remaining battery level of wireless access point terminal 200 is 30% or lower and the time slot is 7:00 to 17:00.

Operation state determining section 205 in FIG. 3 judges whether or not it is required to reduce power consumption.

More specifically, when the condition indicated by the operation state information stored in operation condition setting section 204 is satisfied, operation state determining section 205 judges that it is required to reduce power consumption and determines to shift from the normal mode to the limited operation mode. Meanwhile, when the condition indicated by the operation state information stored in operation condition setting section 204 is not satisfied, operation state determining section 205 judges that it is not required to reduce power consumption and determines to shift from the limited operation mode to the normal mode. Operation state determining section 205 outputs the judgment result (determination result of shifting of the operation mode) as to whether or not it is required to reduce power consumption to connection control section 208. It should be noted that in-coverage terminal managing section 203 may determine whether or not it is required to reduce power consumption sequentially or in response to a request from connection control section 208.

Connection setting value storing section 206 sets various parameters (hereinafter, referred to as "connection setting parameters") necessary for protocol processing section 202 to connect each wireless LAN terminal 300 to the network for each operation mode.

More specifically, connection setting value storing section 206 stores a connection setting parameter for the normal mode and a connection setting parameter for the limited operation mode in advance. Hereinafter, the connection setting parameter for the normal mode will be referred to as a "normal mode connection setting parameter" and the connection setting parameter for the limited operation mode will be referred to as a "limited operation mode connection setting parameter."

<Explanation of Connection Setting Parameter>

FIG. 6 illustrates an example of contents of a connection setting parameter.

As illustrated in FIG. 6, contents of normal mode connection setting parameter 521 differ from those of limited operation mode connection setting parameter 522. For example, the beacon period for limited operation mode connection setting parameter 522 is longer than that of normal mode connection setting parameter 521. Further, the maximum transmission power for limited operation mode connection setting parameter 522 is smaller than that of normal mode connection setting parameter 521. Still further, the number of transmission rates to be used for limited operation mode connection setting parameter 522 is smaller than that of normal mode connection setting parameter 521. That is, wireless communication with smaller power consumption is provided using limited operation mode connection setting parameter 522 than that provided using normal mode connection setting parameter 521.

Disconnected terminal managing section 207 in FIG. 3 manages information regarding wireless LAN terminal 300 which is disconnected from the network.

More specifically, when receiving a report of wireless LAN terminal 300 which has been disconnected from the network from connection control section 208 which will be described later, disconnected terminal managing section 207 adds a predetermined valid period to the information indicating corresponding wireless LAN terminal 300 and records the information. Hereinafter, the information of wireless LAN terminal 300 to which a predetermined valid period is added will be referred to as "disconnected terminal information." Further, when receiving a report of wireless LAN terminal 300 which has been reconnected to the network from connection control section 208 to be described later, disconnected terminal managing section 207 deletes the record of corresponding wireless LAN terminal 300 from the disconnected terminal information. Still further, disconnected terminal managing section 207 deletes a record which has been recorded for a period longer than the predetermined valid period from the disconnected terminal information.

<Explanation of Disconnected Terminal Information>

Figure 7:
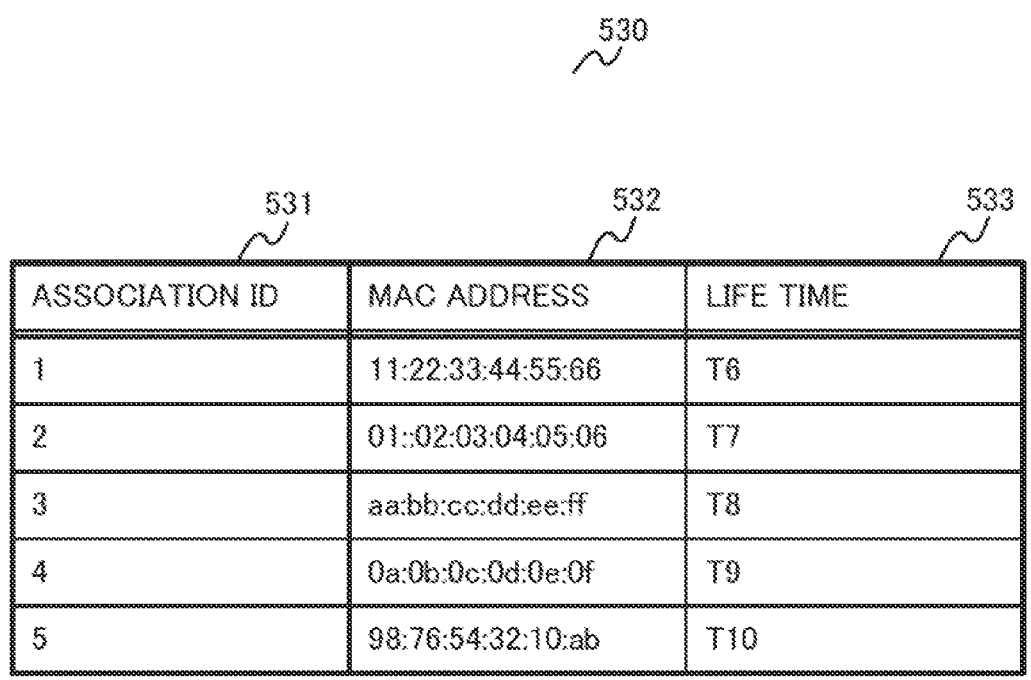
FIG. 7 illustrates an example of contents of disconnected terminal information in Embodiment 2 of the present invention.

FIG. 7 illustrates an example of contents of the disconnected terminal information.

As illustrated in FIG. 7, in disconnected terminal information 530, association ID 531, MAC address 532 and life time 533 are described in association with each other.

Association ID 531 and MAC address 532 are reported from connection control section 208 to be described later, when wireless communication with wireless LAN terminal 300 is started. Life time 533 is an expiration time of the above-described predetermined valid period and is a time for disconnected terminal managing section 207 to delete an entry from disconnected terminal information 530.

It should be noted that disconnected terminal managing section 207 may estimate an operable period of wireless LAN terminal 300 for each wireless LAN terminal 300 from information such as the remaining battery level of wireless LAN terminal 300. Disconnected terminal managing section 207 may also set life time 533 based on an expiration time of the estimated operable period. Further, disconnected terminal managing section 207 may set a time after a predetermined time has elapsed from a connection start time as life time 533 for each wireless LAN terminal 300 or may set the same time for all the wireless LAN terminals.

Connection control section 208 in FIG. 3 sets an appropriate connection setting parameter among the connection setting parameters stored in connection setting value storing section 206 to protocol processing section 202, thereby switching the operation mode of wireless access point terminal 200.

Further, connection control section 208 controls wireless communication section 201 to discontinue wireless communication with wireless LAN terminal 300 which is determined not to be continuously connected to the network, under the condition that it is determined that it is required to reduce power consumption. This control is performed by, for example, designating wireless LAN terminal 300 to protocol processing section 202 and indicating discontinuation of the wireless communication. Further, connection control section 208 reports the association ID and MAC address 532 of wireless LAN terminal 300 which is disconnected from the network to disconnected terminal managing section 207. Hereinafter, wireless LAN terminal 300 which is determined to be continuously connected to the network will be referred to as a "continuously connected terminal." Further, wireless LAN terminal 300 whose wireless communication is discontinued by being determined not to be continuously connected to the network will be referred to as a "disconnected and suspended terminal."

Further, when there is a continuously connected terminal, connection control section 208 controls wireless communication section 201 to switch wireless communication with the corresponding continuously connected terminal to wireless communication in the limited operation mode under the condition that it is determined that it is required to reduce power consumption. This control is performed by, for example, setting the limited operation mode connection setting parameter to protocol processing section 202.

Further, connection control section 208 controls wireless communication section 201 to reconnect wireless communication with a disconnected and suspended terminal whose record remains in disconnected terminal managing section 207 under the condition that it is determined that it is not required to reduce power consumption. This control is performed by, for example, designating wireless LAN terminal 300 to protocol processing section 202 and instructing reconnection of the wireless communication. Still further, connection control section 208 reports wireless LAN terminal 300 which is reconnected to the network to disconnected terminal managing section 207.

Further, when there is a continuously connected terminal, connection control section 208 controls wireless communication section 201 to switch the wireless communication with the corresponding continuously connected terminal to wireless communication in the normal mode under the condition that it is determined that it is not required to reduce power consumption. This control is performed by, for example, setting the normal mode connection setting parameter to protocol processing section 202.

It should be noted that among the connection setting parameters, part of the information is indicated to wireless LAN terminal 300 using a beacon signal or a reconnection signal transmitted from wireless communication section 201. The connection setting parameters indicated to wireless LAN terminal 300 include a transmission rate to be used, beacon period information and information such as a DTIM (Delivery Traffic Indication Message) period. With such connection setting parameters, each wireless LAN terminal 300 can perform operation in accordance with the operation mode of wireless access point terminal 200.

Wireless access point terminal 200 has, for example, although not shown, a CPU, a storage medium such as a ROM which stores a control program and a working memory such as a RAM. In this case, the above-described functions of the respective sections are implemented by the CPU which executes the control program.

Further, as illustrated in FIG. 3, the operation of each section of wireless access point terminal 200 may be, for example, controlled by host processing section 222 via bus 221.

Further, wireless access point terminal 200 may include a user interface such as a key switch or a touch panel for allowing a user to operate wireless access point terminal 200. Still further, wireless access point terminal 200 may include an information output apparatus such as a display, a codec, a microphone, a speaker, a camera, a vibrator and/or a recording medium.

Such wireless access point terminal 200 can determine whether or not to continue connection for each wireless LAN terminal 300 and discontinue wireless communication with wireless LAN terminal 300 which is determined not to be continuously connected. Accordingly, even when there is an in-coverage terminal, wireless access point terminal 200 can reduce power consumption.

Further, wireless access point terminal 200 determines whether or not to continue connection to the network based on a condition of each in-coverage terminal, for example, whether or not an elapsed time since the start of wireless communication is long. Accordingly, wireless access point terminal 200 can determine to continue connection for an in-coverage terminal which may cause a problem if the connection is disconnected, so that it is possible to avoid inconvenience due to discontinuation of wireless communication.

Still further, when the mode shifts to the limited operation mode, wireless access point terminal 200 further reduces power consumption by suppressing the amount of data to be relayed regarding wireless communication with the continuously connected terminal as well as by discontinuing wireless communication with wireless LAN terminal 300. Accordingly, wireless access point terminal 200 can further reduce power consumption.

The configuration of wireless access point terminal 200 has been described above.

<Explanation of Operation of Wireless Access Point Terminal>

Operation of wireless access point terminal 200 will be explained.

Figure 8:
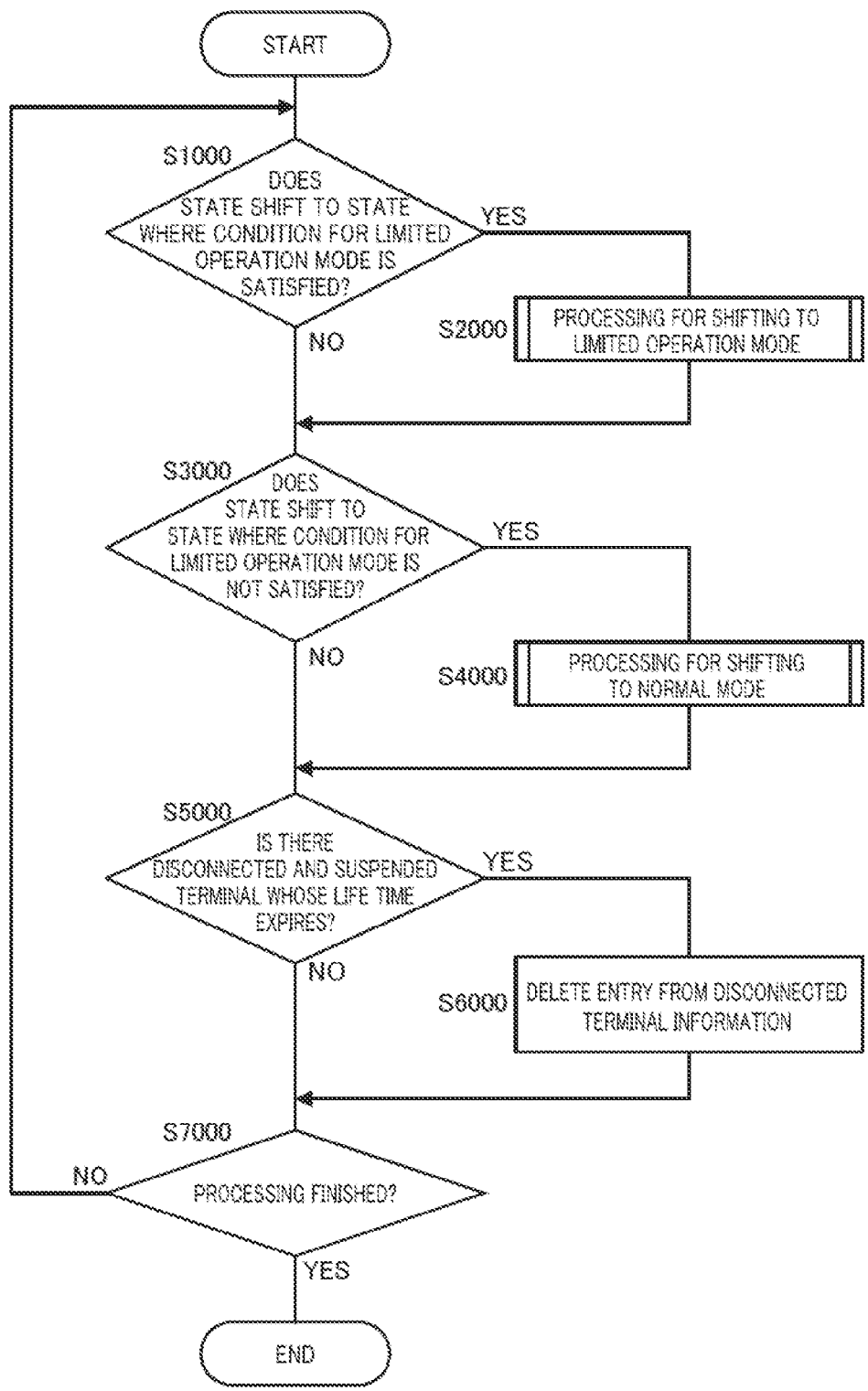
FIG. 8 is a flowchart illustrating an example of operation of the wireless access point terminal according to Embodiment 2 of the present invention.

FIG. 8 is a flowchart illustrating an example of the operation of wireless access point terminal 200.

First, in step S1000, operation state determining section 205 monitors an operation state of wireless access point terminal 200 to judge whether or not the operation state shifts from a state where the condition for the limited operation mode is not satisfied to a state where a condition for the limited operation mode is satisfied.

When operation state determining section 205 judges that the operation state shifts to the state where the condition for the limited operation mode is satisfied (S1000: YES), the procedure proceeds to step S2000. Meanwhile, when operation state determining section 205 judges that the operation state does not shift to the state where the condition for the limited operation mode is satisfied, or, when operation state determining section 205 has already judged that the condition for the limited operation mode was satisfied upon previous judgment (S1000: NO), the procedure proceeds to step S3000.

In step S2000, wireless access point terminal 200 performs processing for shifting to the limited operation mode, and the procedure proceeds to step S3000. The processing for shifting to the limited operation mode is processing for shifting the operation mode of wireless access point terminal 200 from the normal mode to the limited operation mode. The processing for shifting to the limited operation mode will be described in detail later.

In step S3000, operation state determining section 205 monitors the operation state of wireless access point terminal 200 to judge whether or not the operation state shifts from the state where the condition for the limited operation mode is satisfied to the state where the condition for the limited operation mode is not satisfied.

When operation state determining section 205 judges that the operation state shifts to the state where the condition for the limited operation mode is not satisfied (S3000: YES), the procedure proceeds to step S4000. Meanwhile, when operation state determining section 205 judges that the operation state does not shift to the state where the condition for the limited operation mode is not satisfied, or, when operation state determining section 205 has already judged that the condition for the limited operation mode was not satisfied upon the previous judgment (S3000: NO), the procedure proceeds to step S5000.

In step S4000, wireless access point terminal 200 performs processing for shifting to the normal operation mode, and the procedure proceeds to step S5000. The processing for shifting to the normal operation mode is processing for shifting the operation mode of wireless access point terminal 200 from the limited operation mode to the normal operation mode. The processing for shifting to the normal operation mode will be described in detail later.

In step S5000, disconnected terminal managing section 207 judges whether or not there is a disconnected and suspended terminal whose life time expires.

When disconnected terminal managing section 207 judges that there is a disconnected and suspended terminal whose life time expires (S5000: YES), the procedure proceeds to step S6000. Meanwhile, when disconnected terminal managing section 207 judges that there is no disconnected and suspended terminal whose life time expires (S5000: NO), the procedure proceeds to step S7000.

In step S6000, disconnected terminal managing section 207 deletes an entry (record) of the disconnected and suspended terminal whose life time expires from the disconnected terminal information (see FIG. 7), and the procedure proceeds to step S7000.

In step S7000, operation state determining section 205 judges whether or not it is indicated to finish the processing through user operation, or the like, and whether or not it is determined to turn off the function of wireless access point terminal 200 as an access point. Whether or not it is determined to turn off the function of wireless access point terminal 200 as an access point is judged, for example, during processing of step S2060 in FIG. 9, which will be described later.

When operation state determining section 205 judges that it is not indicated to finish the processing and it is not determined to turn off the function as an access point (S7000: NO), the procedure returns to step S1000. Meanwhile, when operation state determining section 205 judges that it is indicated to finish the processing and it is determined to turn off the function as an access point (S7000: YES), a series of processing end by blocking a power source of wireless communication section 201.

<Explanation of Processing for Shifting to Limited Operation Mode>

Figure 9:
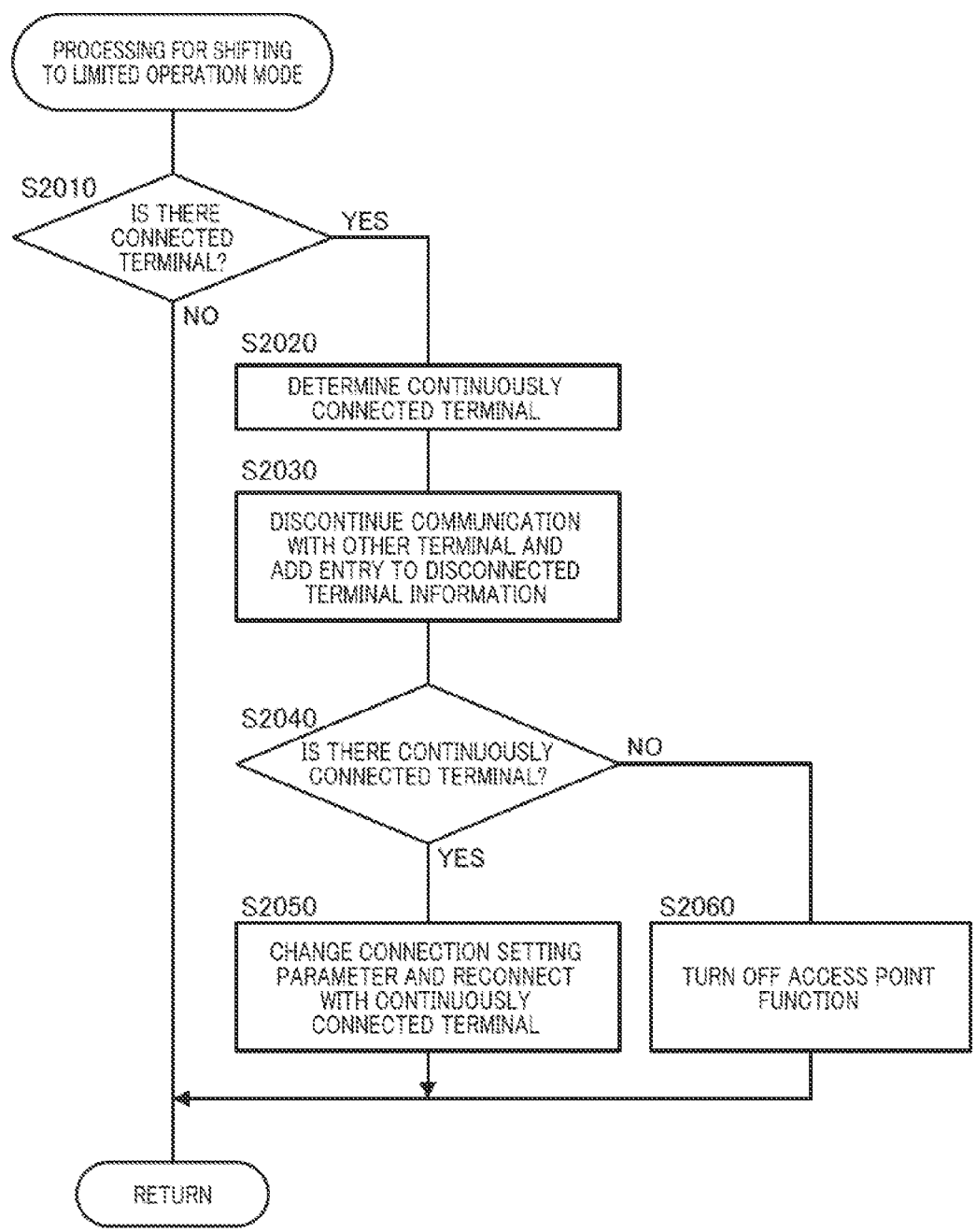
FIG. 9 is a flowchart illustrating an example of processing for shifting to a limited operation mode in Embodiment 2 of the present invention.

FIG. 9 is a flowchart illustrating an example of the processing for shifting to the limited operation mode (step S2000 in FIG. 8).

First, in step S2010, connection control section 208 judges whether or not there is an in-coverage terminal which is connected to the network.

When connection control section 208 judges that there is no in-coverage terminal connected to the network (S2010: NO), the procedure directly returns to the processing in FIG. 8. Meanwhile, when connection control section 208 judges that there is an in-coverage terminal connected to the network (S2010: YES), the procedure proceeds to step S2020.

In step S2020, in-coverage terminal managing section 203 determines an in-coverage terminal which is to be continuously connected to the network (that is, a continuously connected terminal).

For example, in-coverage terminal managing section 203 determines an in-coverage terminal which has been connected for the longest period of time and which has been connected within a predetermined period of time in the management information (see FIG. 4) as the continuously connected terminal. This is because a user is likely to first connect wireless LAN terminal 300 whose priority of continuation of connection is high to the network after activating wireless access point terminal 200. Wireless LAN terminal 300 whose priority of continuation of connection is high is, for example, wireless LAN terminal 300 owned by the user.

In step S2030, connection control section 208 causes protocol processing section 202 to discontinue wireless communication with in-coverage terminals other than the continuously connected terminal. Further, connection control section 208 causes disconnected terminal managing section 207 to add entries (records) of the disconnected and suspended terminals whose wireless communication is discontinued to the disconnected terminal information (see FIG. 7).

In step S2040, connection control section 208 judges whether or not there is a continuously connected terminal.

When connection control section 208 judges that there is a continuously connected terminal (S2040: YES), the procedure proceeds to step S2050. Meanwhile, when connection control section 208 judges that there is no continuously connected terminal (S2040: NO), the procedure proceeds to step S2060.

In step S2050, connection control section 208 causes protocol processing section 202 to reconnect the continuously connected terminal while changing the connection setting parameter to the limited operation mode connection setting parameter, and the procedure returns to the processing in FIG. 8.

In step S2060, connection control section 208 determines to turn off the function of wireless access point terminal 200 as an access point, and the procedure returns to the processing in FIG. 8.

Figure 10:
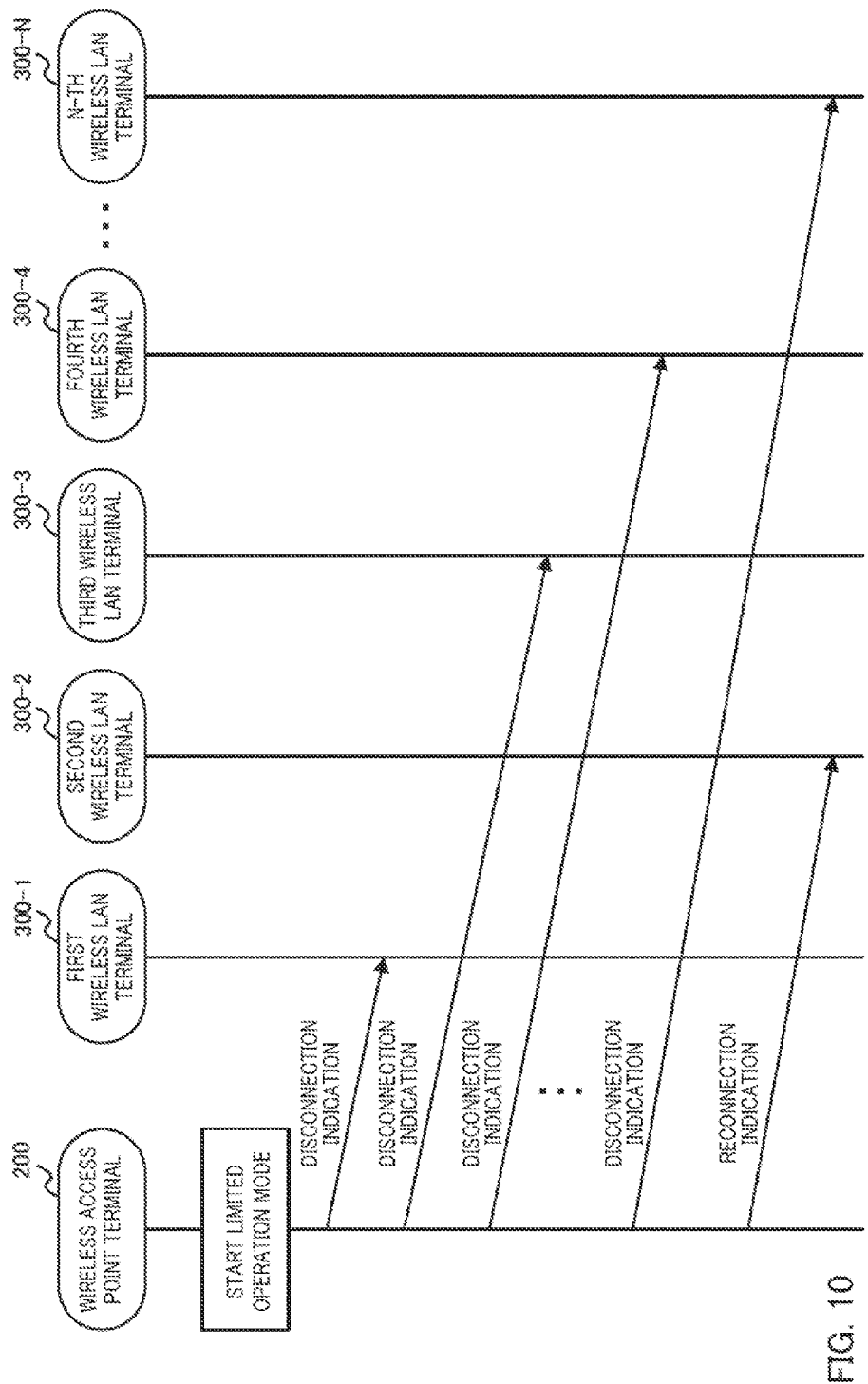
FIG. 10 illustrates an example of an indication to each wireless LAN terminal in Embodiment 2 of the present invention.

FIG. 10 illustrates an example of an indication for each wireless LAN terminal from wireless access point terminal 200 when the operation mode shifts to the limited operation mode.

It is assumed here that among first to N-th wireless LAN terminals 300-1 to 300-N, only second wireless LAN terminal 300-2 is determined as the continuously connected terminal. In this case, as illustrated in FIG. 10, wireless access point terminal 200 indicates disconnection (disassociation) to each of first and third to N-th wireless LAN terminals 300-1 and 300-3 to 300-N (step S2030 in FIG. 9) and indicates reconnection (reassociation) to second wireless LAN terminal 300-2 while changing the connection setting parameter.

<Explanation of Operation of Processing for Shifting to Normal Mode>

Figure 11:
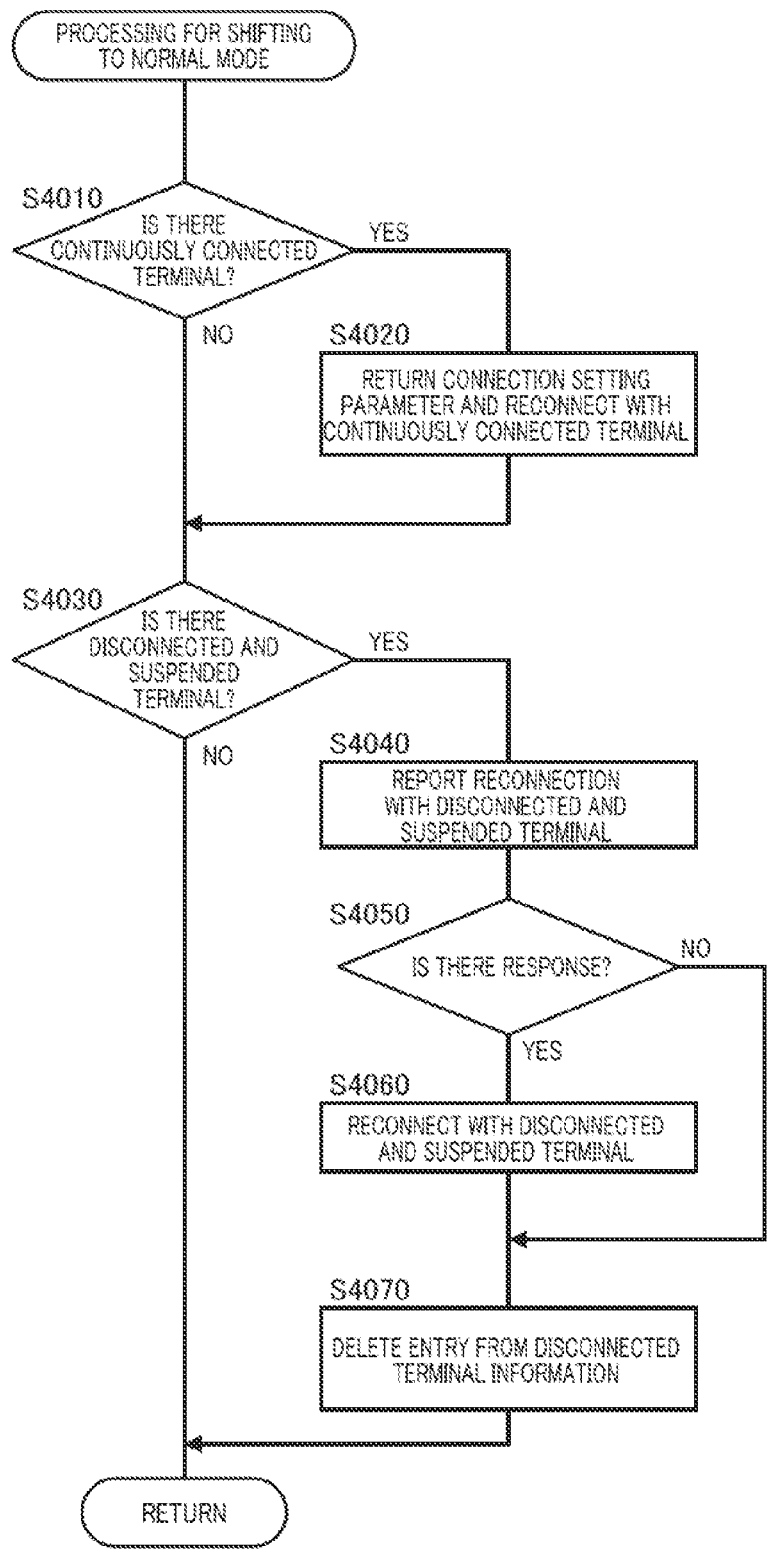
FIG. 11 is a flowchart illustrating processing for shifting to a normal mode in Embodiment 2 of the present invention.

FIG. 11 is a flowchart illustrating an example of the processing for shifting to the normal mode (step S4000 in FIG. 8).

First, in step S4010, connection control section 208 judges whether or not there is an in-coverage terminal connected to the network (that is, a continuously connected terminal).

When connection control section 208 judges that there is an in-coverage terminal connected to the network (S4010: YES), the procedure proceeds to step S4020. Meanwhile, when connection control section 208 judges that there is no in-coverage terminal connected to the network (S4010: NO), the procedure proceeds to step S4030.

In step S4020, connection control section 208 causes protocol processing section 202 to return the connection setting parameter to the normal mode connection setting parameter and reconnect with the continuously connected terminal.

In step S4030, connection control section 208 judges whether or not there is a disconnected and suspended terminal.

When connection control section 208 judges that there is a disconnected and suspended terminal (S4030: YES), the procedure proceeds to step S4040. Meanwhile, when connection control section 208 judges that there is no disconnected and suspended terminal (S4030: NO), the procedure directly returns to the processing in FIG. 8.

In step S4040, connection control section 208 causes protocol processing section 202 to issue a reconnection indication to the disconnected and suspended terminal.

It should be noted that protocol processing section 202 may transmit the reconnection indication using a reassociation response signal or using another signal. For example, protocol processing section 202 transmits the reconnection report to the disconnected and suspended terminal by storing content indicating a reconnection request within a data frame or transmits the reconnection report by providing a field indicating a reconnection request within an information element in a beacon signal. In this case, the corresponding response from the disconnected and suspended terminal does not have to be an acknowledge frame, but may be a data frame including the contents of the reception information.

In step S4050, protocol processing section 202 judges whether or not there is a response signal (acknowledgement) from the disconnected and suspended terminal to which the reconnection indication is transmitted.

When protocol processing section 202 judges that there is a response (S4050: YES), the procedure proceeds to step S4060. Meanwhile, when protocol processing section 202 judges that there is no response (S4050: NO), the procedure proceeds to step S4070 which will be described later.

In step S4060, protocol processing section 202 reconnects with the disconnected and suspended terminal from which a response is received and reports the reconnection to connection control section 208.

In step S4070, connection control section 208 causes disconnected terminal managing section 207 to delete an entry (record) of the reconnected in-coverage terminal from the disconnected terminal information (see FIG. 7), and the procedure returns to the processing in FIG. 8.

With the above operation, wireless access point terminal 200 can switch the operation mode and determine the continuously connected terminal according to the operation state of wireless access point terminal 200 and a state of each in-coverage terminal. That is, even when the operation state of wireless access point terminal 200 deteriorates, wireless access point terminal 200 can achieve power saving while maintaining connection of an important in-coverage terminal. Furthermore, wireless access point terminal 200 can make a reconnection with a disconnected and suspended terminal to return to a normal mode operation when the operation state of wireless access point terminal 200 is improved. Accordingly, wireless access point terminal 200 can operate while appropriately switching the operation mode between the limited operation mode and the normal operation mode and can achieve power saving while maintaining connection quality.

The operation of wireless access point terminal 200 has been described.

As described above, wireless access point terminal 200 according to this embodiment can determine whether or not to continue connection for each wireless LAN terminal 300 and discontinue wireless communication with wireless LAN terminal 300 which is determined not to be continuously connected, so that wireless access point terminal 200 can reduce power consumption even when there is an in-coverage terminal.

It should be noted that a criterion for determining the continuously connected terminal by in-coverage terminal managing section 203 is not limited to the above-described examples.

For example, in-coverage terminal managing section 203 may record a cumulative value of the amount of data of packet transmission and reception and determine wireless LAN terminal 300 which has the highest cumulative value as the continuously connected terminal.

Further, for example, in-coverage terminal managing section 203 may acquire the remaining battery level of each wireless LAN terminal 300 through communication, or the like and determine wireless LAN terminal 300 which has the highest remaining battery level as the continuously connected terminal.

Still further, for example, in-coverage terminal managing section 203 may acquire a Received Signal Strength Indicator (RSSI) from each wireless LAN terminal 300 and determine wireless LAN terminal 300 which has the highest received signal strength as the continuously connected terminal.

Further, for example, in-coverage terminal managing section 203 may receive registration of a MAC address of wireless LAN terminal 300 of a user from the user and determine wireless LAN terminal 300 of the user as the continuously connected terminal.

Still further, for example, in-coverage terminal managing section 203 may add and record the number of times of connection every time each wireless LAN terminal 300 is newly connected and determine wireless LAN terminal 300 which has the largest number of times of connection as the continuously connected terminal.

Further, the operation state information stored in operation condition setting section 204 is not limited to the above-described example.

For example, operation condition setting section 204 may set an upper limit of the number of in-coverage terminals, and may set a condition so that wireless access point terminal 200 operates in the limited operation mode when a connection request which might exceed the upper limit of the number of in-coverage terminals is issued.

Further, for example, operation condition setting section 204 may set an upper limit value of a normal operation mode operating period and may set a condition so that wireless access point terminal 200 operates in the limited operation mode when after the previous charging, a cumulative period during which wireless access point terminal 200 operates as an access point in the normal operation mode exceeds the upper limit value.

Further, operation condition setting section 204 may set a condition, for example, in which part or all of the above-described conditions are combined as the condition for operating in the limited operation mode.

Still further, wireless access point terminal 200 may be an apparatus which is capable of switching between operation as an in-coverage terminal served by another wireless access point terminal and operation as a wireless access point instead of being an apparatus having a single function as the wireless access point.

Embodiment 3

Embodiment 3 of the present invention is an example where a wireless LAN terminal has a sleep function.

In this embodiment, it is assumed that when each wireless LAN terminal is put into a sleep state, each wireless LAN terminal transmits a frame for reporting the sleep state to a wireless access point terminal. The sleep state of the wireless LAN terminal is, for example, a state where the wireless LAN terminal operates in a power saving function specification (power saving mode) prescribed in NPL 1. That is, the above-described frame is a data frame in which, for example, a power management flag indicating that the wireless LAN terminal operates in the power saving mode is set.

<Configuration of Wireless Access Point>

Figure 12:
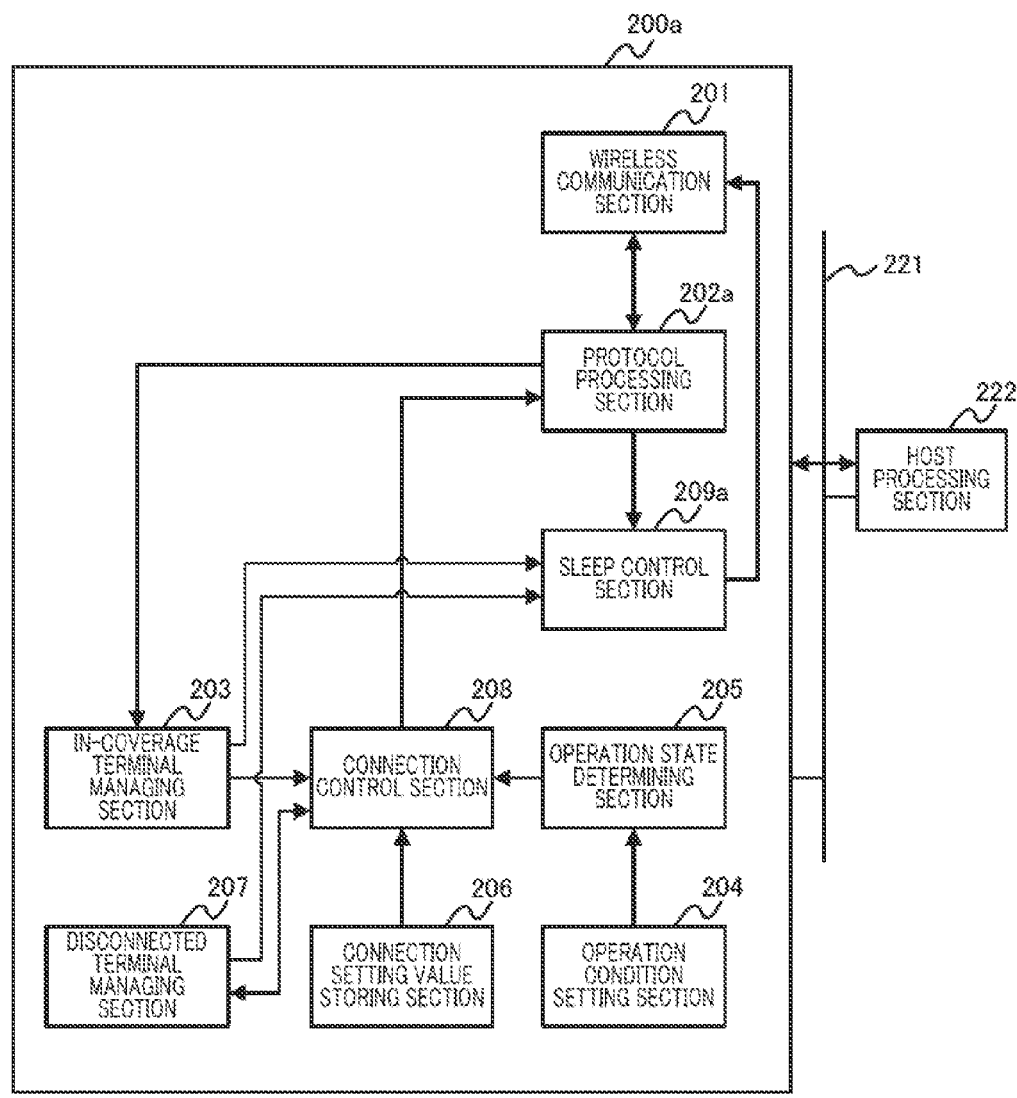
FIG. 12 is a block diagram illustrating an example of a configuration of a wireless access point terminal according to Embodiment 3 of the present invention.

FIG. 12 is a block diagram illustrating an example of a configuration of a wireless access point terminal according to this embodiment and corresponds to FIG. 3 of Embodiment 2. The same reference numerals are assigned to the parts which are the same as FIG. 3, and explanation thereof will be omitted.

In FIG. 12, wireless access point terminal 200a has protocol processing section 202a in place of protocol processing section 202 in FIG. 3. Further, wireless access point terminal 200a further has sleep control section 209a.

Protocol processing section 202a has a function similar to that of protocol processing section 202 in Embodiment 2. Further, protocol processing section 202a has a function of, when receiving a sleep report from wireless LAN terminal 300, reporting to sleep control section 209a wireless LAN terminal 300 from which the sleep report is received.

Sleep control section 209a judges whether or not all the connected in-coverage terminals are put into a sleep state from the report from protocol processing section 202a, the operation state information managed by in-coverage terminal managing section 203 and the disconnected terminal information managed by disconnected terminal managing section 207. Sleep control section 209a puts wireless communication section 201 into a sleep state under the condition that it is judged that the connected in-coverage terminals (that is, all the in-coverage terminals with which wireless communication section 201 performs wireless communication) are put into a sleep state. More specifically, sleep control section 209a blocks a power source of wireless communication section 201.

<Explanation of Operation of Wireless Access Point Terminal>

Figure 13:
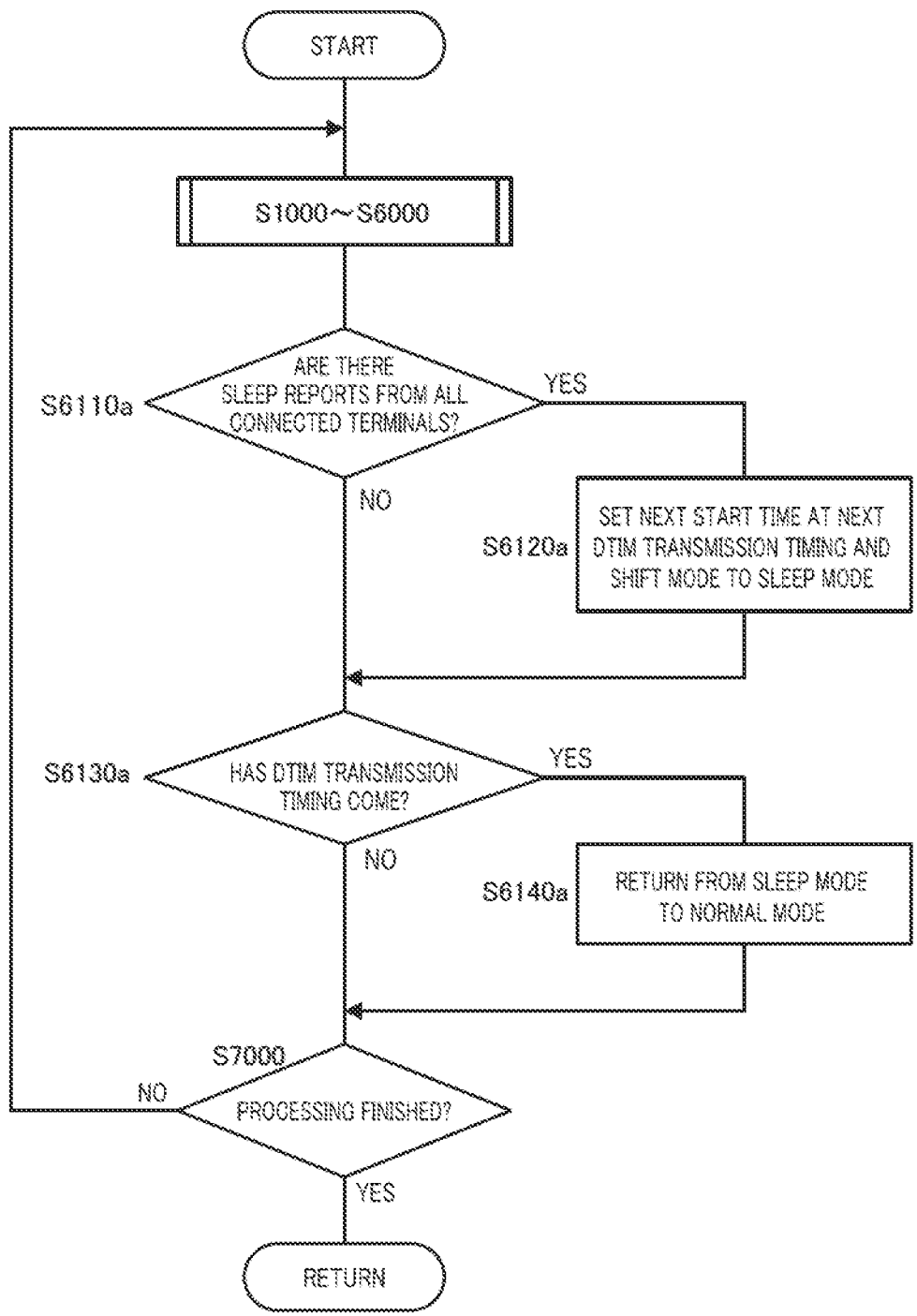
FIG. 13 is a flowchart illustrating an example of operation of the wireless access point terminal according to Embodiment 3 of the present invention.

FIG. 13 is a flowchart illustrating an example of operation of wireless access point terminal 200a and corresponds to FIG. 8 of Embodiment 2. The same step numbers are assigned to the parts which are the same as those in FIG. 8 and explanation thereof will be omitted.

After the processing of step S6000, the procedure for wireless access point terminal 200a proceeds to step S6110a.

In step S6110a, sleep control section 209a determines whether or not there are sleep reports from all the connected in-coverage terminals.

When sleep control section 209a judges that there are sleep reports from all the connected in-coverage terminals (S6110a: YES), the procedure proceeds to step S6120a. Meanwhile, when sleep control section 209a judges that there is at least one connected in-coverage terminal from which a sleep report is not received (S6110a: NO), the procedure directly proceeds to step S6130a.

In step S6120a, sleep control section 209a sets the next starting time at the next DTIM transmission timing and puts wireless communication section 201 into a sleep mode. That is, sleep control section 209a blocks the power source of wireless communication section 201.

In step S6130a, sleep control section 209a judges whether or not the DTIM transmission timing has come.

When sleep control section 209a judges that the DTIM transmission timing has come (S6130a: YES), the procedure proceeds to step S6140a. Meanwhile, when sleep control section 209a judges that the DTIM transmission timing has not come (S6130a: NO), the procedure directly proceeds to step S7000.

In step S6140a, sleep control section 209a returns wireless communication section 201 to the normal mode, and the procedure proceeds to step S7000. That is, sleep control section 209a unblocks the power source to wireless communication section 201.

In wireless access point terminal 200a according to this embodiment as described above, all the connected in-coverage terminals can be put into a sleep state, and the operation of wireless communication section 201 can be stopped when wireless communication section 201 does not have to operate, so that wireless access point terminal 200a can further reduce power consumption even when there is an in-coverage terminal.

It should be noted that the next starting time may be other timings such as the next beacon transmission timing and a timing after 200 ms, in place of the next DTIM transmission timing.

Further, sleep control section 209a may perform control so as not to put wireless communication section 201 into the sleep mode during the normal mode.

Embodiment 4

Embodiment 4 of the present invention is an example where a terminal to be disconnected is determined using electric field communication.

The electric field communication is data communication which utilizes an electric field occurring on a surface of an object such as a human body. For example, when a user wears a plurality of apparatuses, it is possible to perform electric field communication between these apparatuses. Further, for example, it is possible to perform electric field communication between an apparatus on a table at which the user is working and an apparatus the user wears. That is, the apparatus which is capable of performing electric field communication with the apparatus the user wears is highly likely to be belongings of the user.

Accordingly, assuming that the wireless LAN terminal which is capable of performing electric field communication with the wireless access point terminal is belongings of the user, the wireless access point terminal according to this embodiment determines that the wireless LAN terminal as the continuously connected terminal in the limited operation mode. It is assumed that the wireless access point terminal and each wireless LAN terminal according to this embodiment have electric field communication modules.

<Configuration of Wireless Access Point Terminal>

Figure 14:
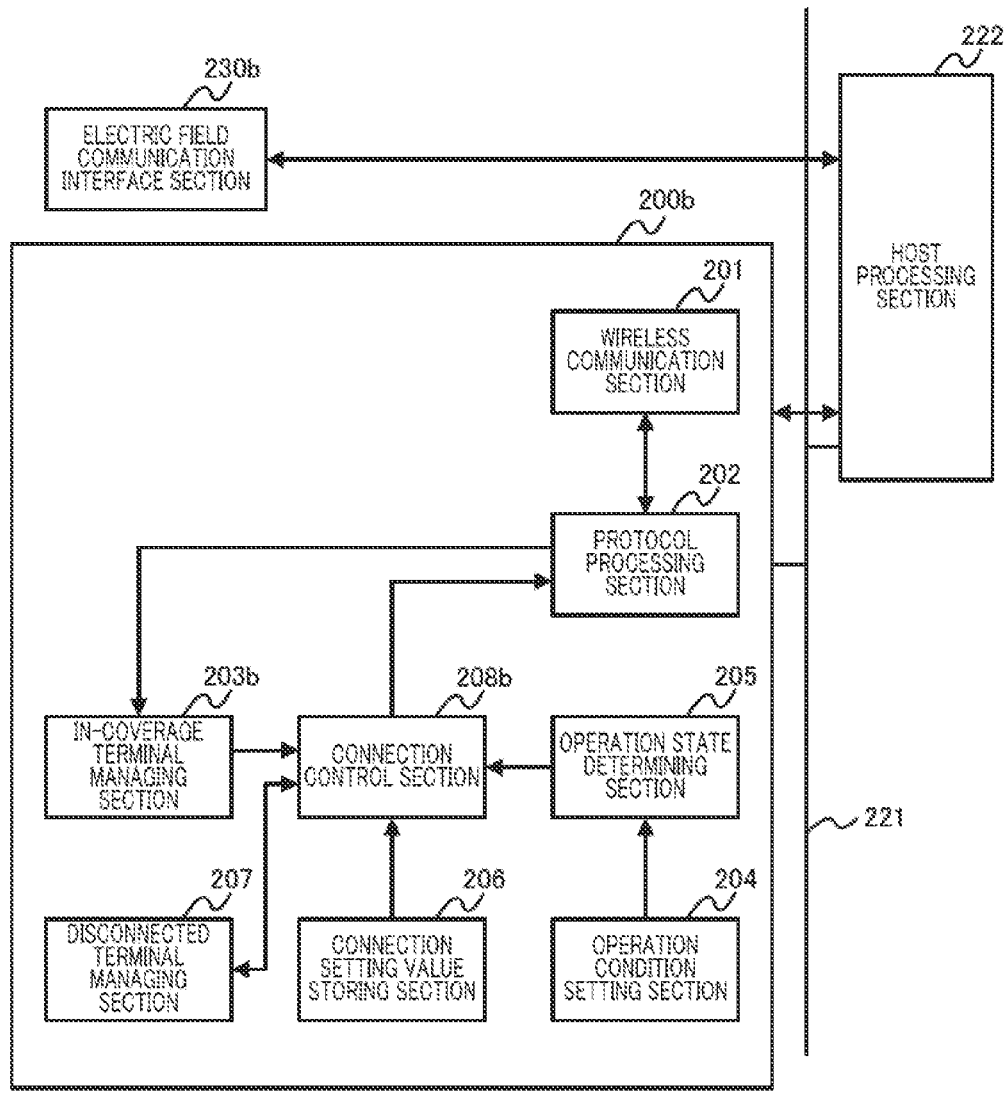
FIG. 14 is a block diagram illustrating an example of a configuration of a wireless access point terminal according to Embodiment 4 of the present invention.

FIG. 14 is a block diagram illustrating an example of a configuration of the wireless access point terminal according to this embodiment and corresponds to FIG. 3 of Embodiment 2. The same reference numerals are assigned to the components which are the same as those in FIG. 3 and explanation thereof will be omitted.

In FIG. 14, wireless access point terminal 200b has in-coverage terminal managing section 203b and connection control section 208b in place of in-coverage terminal managing section 203 and connection control section 208 in FIG. 3.

Connection control section 208b has a function similar to that of connection control section 208 in FIG. 3.

Further, when the mode shifts to the limited operation mode, connection control section 208b activates electric field communication interface section 230b including an electric field communication module. Electric field communication interface section 230b is activated, for example, via host processing section 222. It is assumed here that electric field communication interface section 230b is integrally provided with wireless access point terminal 200b. That is, it is assumed that a user of wireless access point terminal 200b wears electric field communication interface section 230b.

Further, connection control section 208b causes protocol processing section 202 to transmit a signal indicating start of electric field communication with electric field communication interface section 230b (electric field communication module ON request signal) to each in-coverage terminal. That is, connection control section 208b tries to start electric field communication between electric field communication interface section 230b and each in-coverage terminal. Further, connection control section 208b subsequently causes protocol processing section 202 to transmit a signal indicating termination of electric field communication with electric field communication interface section 230b (electric field communication module OFF request signal) to each in-coverage terminal. It should be noted that every time connection control section 208b instructs transmission of the electric field communication module ON request signal or the electric field communication module OFF request signal, connection control section 208b reports this request and to which in-coverage terminal this request is issued to in-coverage terminal managing section 203b. Hereinafter, an interval from when transmission of the electric field communication module ON request signal is indicated until when transmission of the electric field communication module OFF request signal is indicated (that is, an interval during which electric field communication is tried) is referred to as an "electric field communication determining interval."

In-coverage terminal managing section 203b has a function similar to that of in-coverage terminal managing section 203 in FIG. 3.

Further, in-coverage terminal managing section 203b acquires information indicating whether or not it is possible to perform electric field communication with each in-coverage terminal from electric field communication interface section 230b. The information is acquired, for example, via host processing section 222. When there is an in-coverage terminal which can perform electric field communication, in-coverage terminal managing section 203b judges the in-coverage terminal which can perform electric field communication as the in-coverage terminal belonging to the user of wireless access point terminal 200b and gives priority to the in-coverage terminal to determine the continuously connected terminal.

<Explanation of Management Information>

Figure 15:
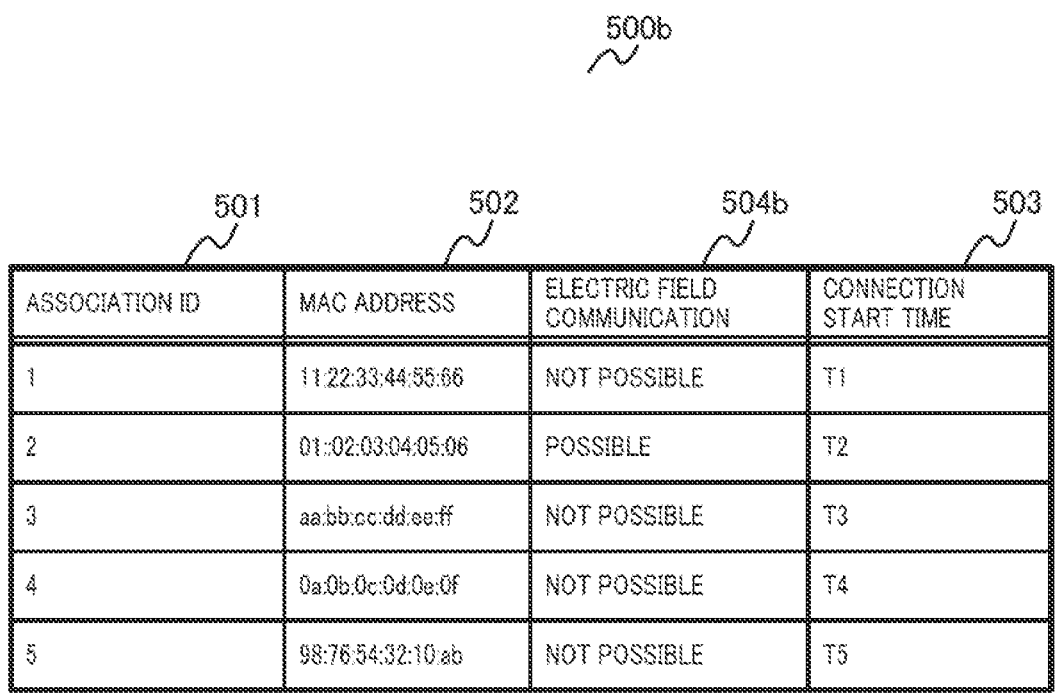
FIG. 15 illustrates an example of contents of management information in Embodiment 4 of the present invention.

FIG. 15 illustrates an example of contents of the management information in this embodiment and corresponds to FIG. 4 in Embodiment 2. The same reference numerals are assigned to the parts which are the same as those in FIG. 4 and explanation thereof will be omitted.

As illustrated in FIG. 15, in management information 500b in this embodiment, for example, information (electric field communication) 504b which indicates whether or not it is possible to perform electric field communication is described for each in-coverage terminal. In this embodiment, information (electric field communication) 504b corresponds to belonging information indicating whether or not each in-coverage terminal belongs to the user of wireless access point terminal 200b. Further, a pair of wireless access point terminal 200b and connection start time 503 corresponds to the above-described terminal attribute information.

In-coverage terminal managing section 203b determines an in-coverage terminal which has the oldest connection start time 503 among in-coverage terminals for which electric field communication 504b is "possible" as the continuously connected terminal. In the example illustrated in FIG. 15, for example, the in-coverage terminal having association ID 501 of "2" is determined as the continuously connected terminal.

<Explanation of Processing for Shifting to Limited Operation Mode>

Figure 16:
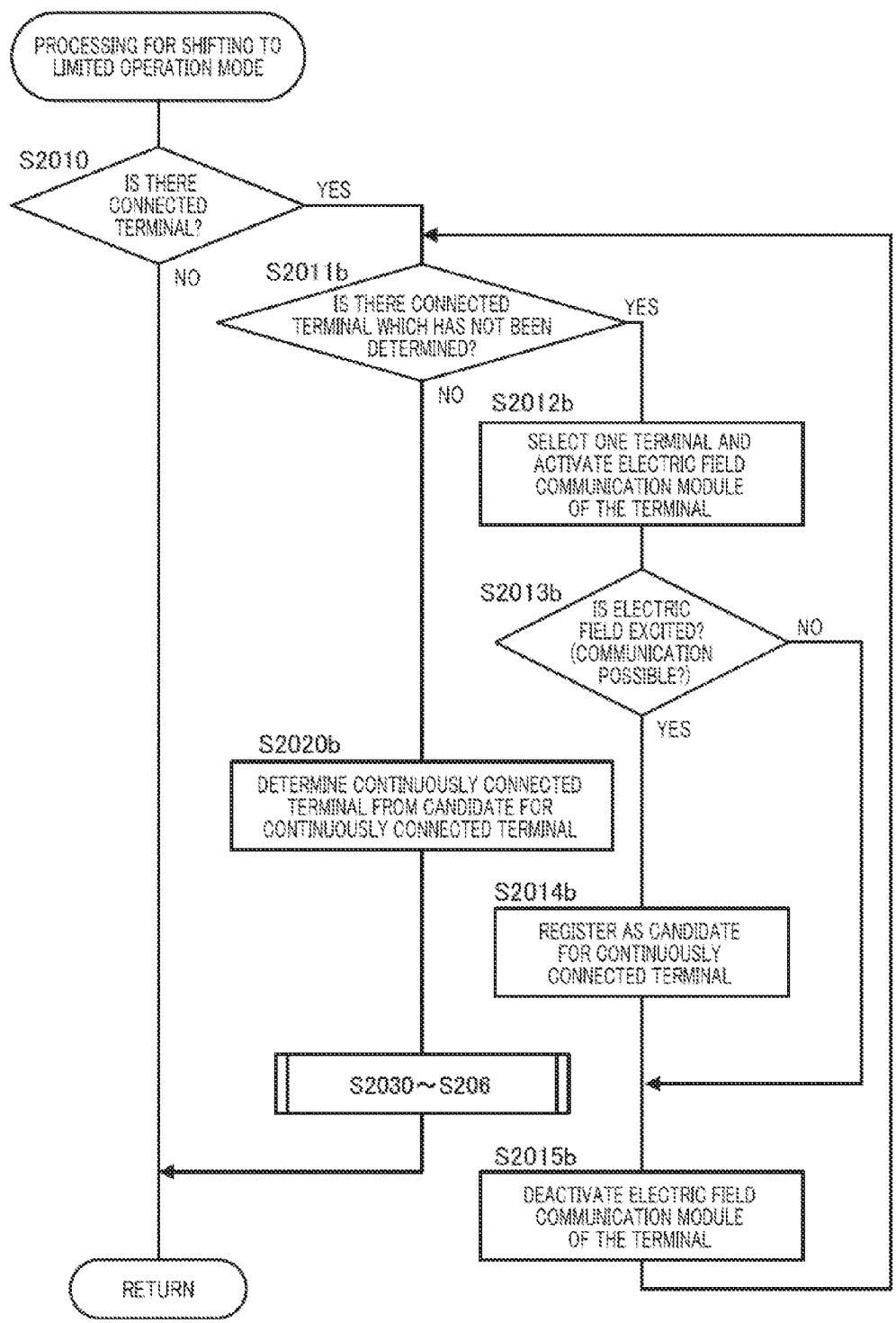
FIG. 16 is a flowchart illustrating processing for shifting to a limited operation mode in Embodiment 4 of the present invention.

FIG. 16 is a flowchart illustrating an example of the processing for shifting to the limited operation mode in this embodiment and corresponds to FIG. 9 in Embodiment 2. The same step numbers are assigned to the parts which are the same as those in FIG. 9, and explanation thereof will be omitted.

When connection control section 208 judges that there is an in-coverage terminal connected to the network (S2010: YES), the procedure proceeds to step S2011b. Here, when electric field communication interface section 230b is not activated, connection control section 208b activates electric field communication interface section 230b.

In step S2011b, connection control section 208b judges whether or not there is a connected in-coverage terminal for which it has not been determined whether or not electric field communication is possible.

When connection control section 208b judges that there is an in-coverage terminal for which it has not been determined (S2011b: YES), the procedure proceeds to step S2012b. Meanwhile, when connection control section 208b judges that there is no in-coverage terminal for which it has not been determined (S2011b: NO), the procedure proceeds to step S2020b which will be described later.

In step S2012b, connection control section 208b selects one in-coverage terminal for which it has not been determined and activates the electric field communication module of the selected in-coverage terminal. That is, connection control section 208b starts the electric field communication determining interval between the selected in-coverage terminal and electric field communication interface section 230b by transmitting the electric field communication module ON request signal.

In step S2013b, in-coverage terminal managing section 203b judges whether or not electric field is excited in electric field communication interface section 230b during the electric field communication determining interval, or whether or not it is possible to perform communication. This judgment may be performed in place of judgment as to whether or not processing for transmitting and receiving information is actually performed between electric field communication interface section 230b and the selected in-coverage terminal.

When in-coverage terminal managing section 203b judges that the electric field is excited (S2013b: YES), the procedure proceeds to step S2014b. Meanwhile, when in-coverage terminal managing section 203b judges that the electric field is not excited (S2013b: NO), the procedure directly proceeds to step S2015b which will be described later.

In step S2014b, in-coverage terminal managing section 203b registers the selected in-coverage terminal as a candidate for the continuously connected terminal. This registration is performed, for example, by recording that electric field communication is possible in the corresponding entry of management information 500b (see FIG. 15).

In step S2015b, connection control section 208b deactivates the electric field communication module of the selected in-coverage terminal, and the procedure returns to step S2011b. That is, connection control section 208b finishes the electric field communication determining interval between the selected in-coverage terminal and electric field communication interface section 230b by transmitting the electric field communication module OFF request signal.

In step S2020b, in-coverage terminal managing section 203b determines the continuously connected terminal among candidates for the continuously connected terminal and the procedure proceeds to step S2030. It should be noted that there is a case where there is no candidates for the continuously connected terminal at this point or a case where the continuously connected terminal cannot be determined among the candidates for the continuously connected terminal. In this case, connection control section 208b may determine to turn off the function of wireless access point terminal 200b to serve as the access point. Further, when the procedure proceeds to step S2020b, connection control section 208b may stop electric field communication interface section 230b.

Wireless access point terminal 200b according to this embodiment as described above can specify the in-coverage terminal owned by the user using electric field communication and give priority to the in-coverage terminal to determine the continuously connected terminal, so that wireless access point terminal 200b can realize power saving while avoiding inconvenience due to discontinuation of wireless communication with the in-coverage terminal owned by the user.

It should be noted that wireless access point terminal 200b may activate electric field communication interface section 230b every time a target used to determine whether or not the in-coverage terminal is owned by the user is switched.

Further, wireless access point terminal 200b may acquire identification information (such as a MAC address) of the in-coverage terminal of a communication counterpart of electric field communication interface section 230b from electric field communication interface section 230b and determine the in-coverage terminal owned by the user. In this case, wireless access point terminal 200b first broadcasts electric field communication module ON request signals to all the connected in-coverage terminals. When wireless access point terminal 200b can acquire a MAC address via electric field communication interface section 230b immediately after this broadcasting, wireless access point terminal 200b registers the in-coverage terminal corresponding to the MAC address as a candidate for the continuously connected terminal.

While it is assumed in Embodiments 2 to 4 described above that the wireless access point terminal according to the present invention uses wireless LAN, the wireless access point terminal is not limited to the wireless LAN as long as the wireless access point terminal is an apparatus which relays data. For example, the wireless access point terminal according to the present invention can be applied to a wireless system such as Bluetooth (registered trademark), Zigbee (registered trademark) and WiMAX (registered trademark).

Each function block, the host processing section, and electric field communication interface section of the wireless access point terminal are typically implemented as an LSI constituted by an integrated circuit. These functional blocks may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI as a result of the advancement of semiconductor technology or a technology derivative of semiconductor technology, it is naturally also possible to carry out function block integration using this technology. Application of biotechnology is also possible.

A wireless access point terminal according to this disclosure is a wireless access point terminal configured to individually connect a plurality of in-coverage terminals to a network using a wireless communication section that is allowed to individually perform wireless communication with the plurality of in-coverage terminals, the wireless access point terminal including: an in-coverage terminal managing section that determines whether or not to continue the connection for each of the connected in-coverage terminals; and a connection control section that controls the wireless communication section to discontinue the wireless communication with the in-coverage terminal which is determined not to be continuously connected.

In the wireless access point terminal according to this disclosure, the in-coverage terminal managing section acquires terminal attribute information indicating priority for continuing the connection of the in-coverage terminals for each in-coverage terminal and determines whether or not to continue the connection based on the acquired terminal attribute information.

In the wireless access point terminal according to this disclosure: the terminal attribute information includes an elapsed time since start of wireless communication with the wireless communication section; and the in-coverage terminal managing section gives priority to the in-coverage terminal having a longer elapsed time to determine continuation of the connection for the in-coverage terminal.

In the wireless access point terminal according to this disclosure: the terminal attribute information includes belonging information indicating whether or not the in-coverage terminal belongs to a user of the wireless access point terminal; and the in-coverage terminal managing section gives priority to the in-coverage terminal belonging to the user of the wireless access point terminal to determine continuation of the connection for the in-coverage terminal.

In the wireless access point terminal according to this disclosure: when there is an in-coverage terminal that is allowed to perform communication using an electric field communication interface section configured to perform communication through a body of the user as a communication medium, the belonging information includes information indicating the in-coverage terminal; and the in-coverage terminal managing section judges the in-coverage terminal that is allowed to perform communication using the electric field communication interface section, as the in-coverage terminal belonging to the user of the wireless access point terminal.

In the wireless access point terminal according to this disclosure, the connection control section puts the wireless communication section into a sleep state under the condition that all the in-coverage terminals with which the wireless communication section performs wireless communication are put into a sleep state.

The wireless access point terminal according to this disclosure further includes an operation state determining section that judges whether or not it is required to reduce power consumption, in which the connection control section controls the wireless communication section to discontinue the wireless communication with the in-coverage terminal which is determined not to be continuously connected under the condition that it is judged that it is required to reduce power consumption.

In the wireless access point terminal according to this disclosure, the connection control section controls the wireless communication section to reconnect the wireless communication with the in-coverage terminal which is determined not to be continuously connected and with which the wireless communication is discontinued under the condition that it is judged that it is not required to reduce power consumption.

In the wireless access point terminal according to this disclosure, the connection control section controls the wireless communication section to reconnect the wireless communication with the in-coverage terminal under the condition that a request for reconnecting the wireless communication is received from the in-coverage terminal which is determined not to be continuously connected and with which the wireless communication is discontinued.

In the wireless access point terminal according to this disclosure, when there is the in-coverage terminal which is determined to be continuously connected, the connection control section controls the wireless communication section to switch the wireless communication with the in-coverage terminal to more power-saving wireless communication.

A connection control method according to this disclosure is a connection control method in a wireless access point terminal configured to individually connect a plurality of in-coverage terminals to a network using a wireless communication section that is allowed to individually perform wireless communication with the plurality of in-coverage terminals, the connection control method including: determining whether or not to continue connection for each of the connected in-coverage terminals; and controlling the wireless communication section to discontinue the wireless communication with the in-coverage terminal which is determined not to be continuously connected.

The disclosure of Japanese Patent Application No. 2011-264567, filed on Dec. 2, 2011, including the specification, drawings, and abstract, is incorporated herein by reference in its entirety.

INDUSTRIAL APPLICABILITY

The present invention is useful as a wireless access point terminal and a connection control method which can reduce power consumption even when there is an in-coverage terminal. For example, the present invention is suitable for use in a wireless LAN card, a wireless LAN module, a mobile phone equipped with a wireless LAN, or the like. Further, the present invention can be applied to a personal computer, a tablet terminal, a portable navigation terminal, an electronic book, or the like equipped with a wireless LAN interface.

REFERENCE SIGNS LIST

100 Wireless communication system
200, 200a, 200b Wireless access point terminal
201 Wireless communication section
202, 202a Protocol processing section
203, 203b In-coverage terminal managing section
204 Operation condition setting section
205 Operation state determining section
206 Connection setting value storing section
207 Disconnected terminal managing section
208, 208b Connection control section
209a Sleep control section
221 Bus
222 Host processing section
230b Electric field communication interface section
300 Wireless LAN terminal
400 Internet

The invention claimed is:

1. A wireless access point terminal configured to individually connect a plurality of in-coverage terminals to a network using a wireless communication section that is allowed to individually perform wireless communication with the plurality of in-coverage terminals, the wireless access point terminal comprising:
an in-coverage terminal managing section that determines whether or not to continue the connection for each of the connected in-coverage terminals; and
a connection control section that controls the wireless communication section to discontinue the wireless communication with the connected in-coverage terminal which is determined not to be continuously connected,
wherein:
the in-coverage terminal managing section acquires, for each of the connected in-coverage terminals, terminal attribute information including an elapsed time since a start of the wireless communication with the connected in-coverage terminal, and gives priority to the connected in-coverage terminal having the longer elapsed time to determine continuation of the connection for the connected in-coverage terminal,
the connection control section controls the wireless communication section to reconnect the wireless communication with the in-coverage terminal which is determined not to be continuously connected and with which the wireless communication is discontinued under the condition that it is judged that it is not required to reduce power consumption, and
the connection control section controls the wireless communication section to reconnect the wireless communication with the in-coverage terminal under the condition that a request for reconnecting the wireless communication is received from the in-coverage terminal which is determined not to be continuously connected and with which the wireless communication is discontinued.

2. The wireless access point terminal according to claim 1, wherein:
the terminal attribute information includes belonging information indicating whether or not the connected in-coverage terminal belongs to a user of the wireless access point terminal; and
the in-coverage terminal managing section gives priority to the connected in-coverage terminal belonging to the user of the wireless access point terminal to determine continuation of the connection for the connected in-coverage terminal.

3. The wireless access point terminal according to claim 2, wherein:
the belonging information indicates which of the terminals is allowed to perform communication using an electric field communication interface section configured to perform communication through a body of the user as a communication medium; and
the in-coverage terminal managing section judges the in-coverage terminal that is allowed to perform communication using the electric field communication interface section, as the in-coverage terminal belonging to the user of the wireless access point terminal.

4. The wireless access point terminal according to claim 1, wherein the connection control section puts the wireless communication section into a sleep state under the condition that all the in-coverage terminals with which the wireless communication section performs wireless communication are put into a sleep state.

5. The wireless access point terminal according to claim 1, further comprising an operation state determining section that judges whether or not it is required to reduce power consumption, wherein
the connection control section controls the wireless communication section to discontinue the wireless communication with the connected in-coverage terminal which is determined not to be continuously connected under the condition that it is judged that it is required to reduce power consumption.

6. The wireless access point terminal according to claim 1, wherein, when there is the in-coverage terminal which is determined to be continuously connected, the connection control section controls the wireless communication section to switch the wireless communication with the in-coverage terminal to more power-saving wireless communication.

7. A connection control method in a wireless access point terminal configured to individually connect a plurality of in-coverage terminals to a network using a wireless communication section that is allowed to individually perform wireless communication with the plurality of in-coverage terminals, the connection control method comprising:
determining whether or not to continue connection for each of the connected in-coverage terminals;
controlling the wireless communication section to discontinue the wireless communication with the connected in-coverage terminal which is determined not to be continuously connected,
acquiring, for each of the connected in-coverage terminals, terminal attribute information including an elapsed time since a start of the wireless communication with the connected in-coverage terminal, and giving priority to the connected in-coverage terminal having the longer elapsed time to determine continuation of the connection for the connected in-coverage terminal, wherein:

the wireless communication section is controlled to reconnect the wireless communication with the in-coverage terminal which is determined not to be continuously connected and with which the wireless communication is discontinued under the condition that it is judged that it is not required to reduce power consumption, and the wireless communication section is controlled to reconnect the wireless communication with the in-coverage terminal under the condition that a request for reconnecting the wireless communication is received from the in-coverage terminal which is determined not to be continuously connected and with which the wireless communication is discontinued.

* * * * *